Patented Feb. 13, 1951

2,541,803

UNITED STATES PATENT OFFICE 2,541,803

PRODUCTION OF ARTIFICIAL PROTEIN THREADS, FILAMENTS, AND THE LIKE

Robert L. Wormell, Coventry, England, assignor to Courtaulds Limited, London, England, a British company No Drawing. Application November 25, 1949, Serial No. 129,525. In Great Britain December 24, 1948

5 Claims. (Cl. 18—54)

This invention relates to the production of artificial threads, fibres, filaments, staple fibres and the like, hereinafter referred to generally as threads, from solutions of proteins such as lactic casein and vegetable seed proteins, otherwise known as vegetable casein, such as soya bean protein and peanut protein.

In the production of artificial protein threads, it is known to extrude a solution of the protein through a jet into a coagulating medium and to subject the resultant thread to a hardening treatment, for example, with a bath containing formaldehyde and one or more metallic salts, in order to render the thread resistant to cold water. The thread is then normally subjected to one or more further hardening and insolubilising treatments in order to render it suitable for textile purposes.

It has also been proposed to stretch protein threads during their manufacture in order to effect an improvement in properties, for example wet and dry tensile strengths. Thus in my United States Patent Specification No. 2,290,789, I have described and claimed a process of improving the properties, for example the wet and dry tenacity and the resistance to hot water, of threads produced from proteins by stretching threads after they have been hardened and thereafter treating them with a hardening agent without allowing them to contract; in carrying out this process, the stretching may be between 50 and 200 per cent.

In the production of non-proteinous artificial threads, for example viscose rayon, cellulose acetate rayon and nylon threads, it is known that by stretching the threads at some stage of their manufacture, improved properties, for example increased tensile strengths, may be obtained and that such stretched threads show a degree of birefringence and give X-ray diagrams which are respectively characteristic of oriented fibres. Natural fibres such as wool and silk are also known to be oriented. In the manufacture of protein threads however, the stretching of coagulated and hardened threads has in general only produced threads having a small degree of orientation as shown by birefringence and X-ray diagrams.

In United States Patent Specification No. 2,211,961 it is proposed to produce protein threads having their molecules oriented parallel to the fibre length by extruding the protein solution into a coagulant which will not denature the protein to form a thread and then stretching the thread while the protein is in its globular state to 300 per cent to 2,000 per cent of its original size in an aqueous bath, preferably an aqueous salt bath, at 50° centigrade to 140° centigrade.

French Specification No. 876,134 describes a process for making a spinning solution in which a cellulose solution such as viscose is mixed with a protein solution, to which has been added an alkaline polysulphide and chloral hydrate. French Specification No. 885,952 describes a process for making protein threads in which coagulant baths having a pH of 5 or more are used and it is stated that the fibres after suitable hardening may be rendered resistant to hot liquids by a second treatment, for example with aluminium salts or chrome tanning salts with or without the addition of formaldehyde, dialdehyde, chloral or similar products.

It is the object of the present invention to provide an improved and economic process for producing oriented high tenacity protein threads, that is to say threads showing a degree of birefringence and giving X-ray diagrams which are respectively characteristic of oriented threads.

In accordance with the present invention, a process for the production of protein threads by extruding a solution of the protein through a jet into a setting medium and treating the resultant thread in at least one aqueous bath containing formaldehyde to render the thread resistant to water includes the steps of treating the thread with an aqueous solution in which is dissolved a halogen-substituted aldehyde whereby the protein is softened and the thread becomes elastic, and stretching the thread at least 50 per cent while it is in the elastic state.

The halogen-substituted aldehyde used is preferably chloral, which may be used in the form of its hydrate. Examples of other halogen-substituted aldehydes which may be used are bromal, monochloracetaldehyde, dichloracetaldehyde and water-soluble halogen-substituted propionaldehydes such as 1:1-dibromopropionaldehyde.

The aqueous solution of the halogen-substituted aldehyde preferably contains one or more salts such as aluminium acetate, calcium chloride, magnesium sulphate or sodium sulphate which are known to assist in hardening the threads; the aqueous solution may also contain other hardening agents such as formaldehyde. The solution may also be heated if desired, temperatures up to the boiling point of water being suitable.

The process according to the invention may be effected by passing the thread through a bath containing the halogen-substituted aldehyde and stretching the thread during its passage through the bath. The stretching may be effected for example by means of stretching rollers suitably arranged within the bath. In an alternative procedure the thread may be passed through a bath containing the halogen-substituted aldehyde and stretched for example by means of rollers or godets after it has been removed from the bath. The treatment of the threads with chloral, or similar halogen-substituted aldehydes, should usually be for about 30 minutes and may be longer, for example 2 hours or more. The actual time of the treatment will depend to some extent on the amount of halogen-substituted aldehyde present in the bath and also on the temperature of the treatment. Solutions of chloral for use in the invention preferably contain from 5 to 100 grams of chloral ($CCl_3.CHO$) per litre of solution, the higher proportions of chloral being preferred when the treatment with the chloral and the stretching are effected simultaneously.

In carrying out the invention, the chloral or other halogen-substituted aldehyde effects a softening of the protein with the result that the thread becomes elastic and can be readily drawn out at ordinary or elevated temperatures for example up to 100° centigrade. The softened state of the protein and the elastic state of the thread persist for some time after the treatment with the chloral so that the threads may be washed in water to remove most or all of the chloral and may then be stretched, for example 100 per cent or more at ordinary temperatures, preferably in the presence of water, to produce oriented protein threads. The stretching must be at least 50 per cent but may be much higher, for example as high as 400 per cent. If formaldehyde is added to the aqueous bath of halogen-substituted aldehyde, the permissible degree of stretching is in general lower than when using corresponding baths in the absence of formaldehyde.

The treatment of the protein threads with the chloral or other similar halogen-substituted aldehydes may be effected at any suitable stage after the initial setting of the threads and either before, during or after the treatment with formaldehyde to render the threads resistant to the action of water. It is preferred, however, to carry out the treatment after the threads have been subjected to a preliminary hardening, stretched and then hardened further without allowing them to contract as described in my United States Patent Specification No. 2,290,789. The treatment of the threads with the chloral may conveniently be effected by feeding a tow of threads into a chloral-containing bath in convolutions as described and claimed in my United States Patent Specification No. 2,383,358.

The oriented protein threads obtained according to the invention may be subsequently treated with one or more hardening or insolubilising baths for the purpose of improving the resistance of the threads to hot aqueous liquids, such as hot water, hot dilute alkalis and hot dilute acids. Hardening and insolubilising processes suitable for use in conjunction with the present invention are described for example in United States Patent Specifications Nos. 2,385,674, 2,372,622 and 2,389,015, the Specifications of applications Serial Nos. 755,244 filed 17th June 1947, now abandoned, and 97096 filed June 3rd 1949 and British Patent Specification No. 567,904.

The stretching process according to the invention, in addition to increasing the birefringence of the threads, also generally improves the wet and dry tenacities of the threads.

The invention is illustrated by the following examples, in which the percentages are by weight:

Example 1

A 20 per cent aqueous solution of peanut protein containing 0.5 per cent of free caustic soda was extruded through a number of multi-hole jets into a coagulant bath at 40° centigrade containing in each litre 10 grams of sulphuric acid, 10 grams of formaldehyde and 400 grams of sodium sulphate. The freshly extruded filaments were collected as a tow and the tow was preliminarily hardened, stretched 550 per cent and then hardened further without allowing the filaments to contract, substantially as described in Example 1 of United States Patent Specification No. 2,290,789. The hardened and stretched tow was then immersed for 2 hours in a solution at 50° centigrade containing in each litre 50 grams of chloral hydrate and 380 grams of sodium sulphate. The tow was then washed in water, whereupon it became very elastic, and was then stretched 100 per cent in water at ordinary temperature (about 20° centigrade). The tow was then further hardened for 2 hours in a bath at 50° centigrade containing in each litre 10 grams of formaldehyde and 400 grams of sodium sulphate. The tow was then washed with water and dried.

Fibres of the tow so produced were found to have a birefringence of 0.006 as compared with 0.008 for wool and 0.003 for fibres produced in the same manner as described above but without the treatment with chloral and the subsequent 100 per cent stretching step. The fibres also gave well-defined X-ray diagrams characteristic of oriented fibres. The wet and dry tenacities of the fibres were also increased by approximately 50 per cent as compared with fibres prepared without the treatment according to the invention.

Example 2

A continuous multi-filament casein thread was prepared by the process of extruding a lactic casein solution through a jet, hardening the thread so formed, stretching the thread and hardening it further under tension substantially as described in Example 1 of United States Patent Specification No. 2,290,789. The thread leaving the hardening bath was then stretched a further 60 per cent in a bath at 85° centigrade containing in each litre 100 grams of chloral hydrate and 200 grams of sodium sulphate; the stretching time of the thread in the bath was 30 minutes. The thread was then hardened for 1 hour in a bath at 50° centigrade containing in each litre 20 grams of formaldehyde and 400 grams of sodium sulphate. The thread was finally washed and dried.

The thread obtained gave on X-ray analysis an X-ray diagram characteristic of oriented fibres. The wet and dry tenacities of the thread were also improved as compared with threads prepared without the treatment according to the invention.

What I claim is:

1. In a process for the production of protein threads by extruding a solution of the protein through a jet into a setting medium, and treating the resultant thread in at least one aqueous bath containing formaldehyde to render the thread resistant to the action of water, the steps of treating the thread with an aqueous solution in which chloral is dissolved, whereby the protein is softened and the thread becomes elastic, and stretching the thread at least 50 per cent while it is in the elastic state.

2. In a process for the production of protein threads by extruding a solution of the protein through a jet into a setting medium, and treating the resultant thread in at least one aqueous bath containing formaldehyde to render the thread resistant to the action of water, the steps of treating the thread with an aqueous solution in which chloral and at least one protein-hardening metallic salt is dissolved, whereby the protein is softened and the thread becomes elastic, and stretching the thread at least 50 per cent while it is in the elastic state.

3. In a process for the production of protein threads by extruding a solution of the protein through a jet into a setting medium, and treating the resultant thread in at least one aqueous bath containing formaldehyde to render the thread resistant to the action of water, the steps of passing the thread through an aqueous bath in which chloral is dissolved, whereby the protein is softened and the thread becomes elastic, and simultaneously stretching the thread during its passage through the said bath.

4. In a process for the production of protein threads by extruding a solution of the protein through a jet into a setting medium and treating the resultant thread in at least one aqueous bath containing formaldehyde to render the thread resistant to the action of water, the steps of passing the thread through an aqueous bath in which chloral is dissolved, whereby the protein is softened and the thread becomes elastic, removing the thread from the bath and then stretching it at least 50 per cent while it is in the elastic state.

5. In a process for the production of protein threads by extruding a solution of the protein through a jet into a setting medium and treating the resultant thread in at least one aqueous bath containing formaldehyde to render the thread resistant to the action of water, the steps of passing the thread through an aqueous bath in which chloral is dissolved, whereby the protein is softened and the thread becomes elastic, removing the thread from the bath, washing the thread to remove at least part of the chloral carried over by the thread and then stretching the thread at least 50 per cent while it is still in an elastic state.

R. L. WORMELL.

REFERENCES CITED

The following references are of record in the file of this patent:

UNITED STATES PATENTS

| Number | Name | Date |
|---|---|---|
| 2,460,372 | Thomson | Feb. 1, 1949 |
| 2,475,697 | Cresswell | July 12, 1949 |

FOREIGN PATENTS

| Number | Country | Date |
|---|---|---|
| 876,134 | France | Oct. 28, 1942 |
| 885,952 | France | Sept. 30, 1943 |